US009448786B1

United States Patent
Emelyanov et al.

(10) Patent No.: US 9,448,786 B1
(45) Date of Patent: *Sep. 20, 2016

(54) METHOD FOR UPDATING OPERATING SYSTEM WITHOUT MEMORY RESET

(71) Applicant: Parallels IP Holdings GmbH, Schaffhausen (CH)

(72) Inventors: Pavel Emelyanov, Moscow (RU); Alexander G. Tormasov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,870

(22) Filed: Jun. 23, 2015

Related U.S. Application Data

(63) Continuation of application No. 14/337,384, filed on Jul. 22, 2014, now Pat. No. 9,063,821, which is a continuation of application No. 13/716,309, filed on Dec. 17, 2012, now Pat. No. 8,789,034.

(60) Provisional application No. 61/582,263, filed on Dec. 31, 2011.

(51) Int. Cl.
G06F 9/44 (2006.01)
G06F 9/445 (2006.01)

(52) U.S. Cl.
CPC .............. *G06F 8/67* (2013.01); *G06F 9/4406* (2013.01)

(58) Field of Classification Search
CPC .................................. G06F 8/67; G06F 9/4406
USPC ................................ 717/168–175; 709/203
See application file for complete search history.

(56) References Cited

U.S. PATENT DOCUMENTS

| | | | | | |
|---|---|---|---|---|---|
| 5,964,889 | A * | 10/1999 | Nachenberg | .......... | G06F 21/566 712/227 |
| 6,594,686 | B1 * | 7/2003 | Edwards | ............... | G06F 21/562 709/203 |
| 6,718,546 | B1 * | 4/2004 | Johnson | ................... | G06F 9/268 712/E9.015 |
| 6,865,733 | B2 * | 3/2005 | Broussard | ................. | G06F 8/36 717/146 |
| 7,146,305 | B2 * | 12/2006 | van der Made | ...... | G06F 21/566 703/22 |
| 7,225,440 | B2 * | 5/2007 | Himmel | ................ | G06F 21/121 717/168 |
| 7,376,944 | B2 * | 5/2008 | Crisan | ....................... | G06F 8/65 713/100 |

(Continued)

OTHER PUBLICATIONS

Goossens et al, "The CompSOC Design Flow for Virtual Execution Platforms", ACM, pp. 1-6, 2013.*

(Continued)

*Primary Examiner* — Anil Khatri
(74) *Attorney, Agent, or Firm* — Bardmesser Law Group

(57) ABSTRACT

The invention relates to a computer-implemented method for updating an operating system (OS) without a memory reset. The method includes launching a Virtual Execution Environment (VEE) under a host OS of a computer system. The VEE can be a VM or a Container. Next, a snapshot of the VEE is generated, including snapshotting user process data, of any processes that run under the VEE. A new OS is loaded onto the computer system, and control is given to the new OS without performing the memory reset. It is ensured that the user process data that is part of the snapshot is unaffected by the loading of the new OS and that the user process data remains in its original location. The VEE is re-launched under the new OS. User process data is restored from the snapshot into a random access memory.

18 Claims, 5 Drawing Sheets

(56) References Cited

U.S. PATENT DOCUMENTS

| | | | |
|---|---|---|---|
| 7,543,287 B2* | 6/2009 | Zimmer | G06F 3/0607 |
| | | | 703/26 |
| 7,590,683 B2* | 9/2009 | Bergen | G06F 9/4856 |
| | | | 709/203 |
| 7,698,700 B2* | 4/2010 | Armstrong | G06F 8/67 |
| | | | 717/169 |
| 7,779,404 B2* | 8/2010 | Movassaghi | H04L 41/0813 |
| | | | 717/168 |
| 8,015,562 B2* | 9/2011 | Cibrario Bertolotti | G06F 9/45533 |
| | | | 718/1 |
| 8,078,765 B2* | 12/2011 | Noguchi | G06F 13/102 |
| | | | 710/36 |
| 8,635,492 B2* | 1/2014 | Gara | G06F 11/1064 |
| | | | 714/11 |
| 8,706,798 B1* | 4/2014 | Suchter | G06F 9/5038 |
| | | | 709/202 |
| 8,914,785 B2* | 12/2014 | Buswell | G06F 9/45558 |
| | | | 717/168 |
| 9,110,702 B2* | 8/2015 | Reuther | G06F 9/45558 |
| 9,223,574 B2* | 12/2015 | Bradbury | G06F 9/3009 |

OTHER PUBLICATIONS

Alpern et al, "PDS: A Virtual Execution Environment for Software Deployment", ACM, pp. 175-185, 2005.*

Hu et al, "Impact of Virtual Execution Environments on Processor Energy Consumption and Hardware Adaptation", ACM, pp. 100-110, 2006.*

Böhnert et al, "A Dynamic Virtual Memory Management under Real-Time Constraints" IEEE, pp. 1-10, 2014.*

Zhang et al, "A Dynamic Memory Management Model on Xen Virtual Machine", IEEE pp. 1609-1613, 2013.*

Chen et al, "Live Updating Operating Systems Using Virtualization", ACM, pp. 35-44, 2006.*

Yang et al, "Dimension: An Instrumentation Tool for Virtual Execution Environments", ACM, pp. 164-174, 2006.*

Dunlap et al, "Execution Replay for Multiprocessor Virtual Machines", ACM, pp. 121-130, 2008.*

Cheng et al, "Efficient Virtualization-Based Application Protection Against Untrusted Operating System", ACM, pp. 345-356, 2015.*

* cited by examiner

METHOD FOR UPDATING OPERATING SYSTEM WITHOUT MEMORY RESET

CROSS-REFERENCE TO RELATED APPLICATIONS

This application is a continuation of U.S. patent application Ser. No. 14/337,384, filed on Jul. 22, 2014, now U.S. Pat. No. 9,063,821, which is a continuation of U.S. patent application Ser. No. 13/716,309, filed on Dec. 17, 2012, now U.S. Pat. No. 8,789,034, which is a non-provisional of U.S. Patent Provisional Application No. 61/582,263, filed on Dec. 31, 2011, the entire contents of which are hereby incorporated by reference.

BACKGROUND OF THE INVENTION

1. Field of the Invention

This invention relates to a method and system for reloading an operating system (OS) in a computer system, and, more particularly, to reloading the OS without a memory reset.

2. Description of the Related Art

Computer systems present some challenges with regard to reloading or re-installing operating systems (OSs). The main problem is a memory management. Typically, a file system needs to be stored to another computer or backed up to a storage media. Otherwise, the file system data is lost after re-installation of the OS.

This problem is addressed by MICROSOFT WINDOWS Hotpatching Technology. However, this technology is highly unstable, for two reasons: (1) binary code analysis required to prepare a binary patch cannot be solved by a deterministic algorithm, and (2) hot-patching only works for code changes that keep objects (data) intact, but only change/fix algorithms. Furthermore, implementation of the updates becomes very complex and expensive. System updates create costly down-times for servers operating with large amounts of data. Conventional methods use data migration to another server. This is also an expensive process requiring at least one more server and also creating a long down-time on the migrated server.

In particular, the problem for a server with a large amount of RAM (e.g., 1 TB) is that transfer of that much data to some other medium (e.g., to a disk, or over a network to another machine) is a long process—several minutes, if not hours, given the limitations of the communications channel bandwidth and/or disk read/write speed. For many applications, this is an unacceptably long time.

Accordingly, there is a need in the art for an efficient and inexpensive method for reloading the OS on a computer system without a physical memory reset.

SUMMARY OF THE INVENTION

Accordingly, the present invention is related to a method for reloading the OS on a computer system without a memory reset that substantially obviates one or more of the disadvantages of the related art.

A computer system has an operating system (OS) running on it. The computer system has containers (or Virtual Machines—VMs), an old OS (to be replaced), a memory area which has data needed for system restart and restore from the container (or the VM). The containers (VMs) are moved into snapshot and a new OS is loaded into the memory. The new OS launches and receives data needed for restore of the system from the snapshot. Then, the new OS activates the containers. Thus, the new OS is reloaded onto the computer system without a memory reset.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
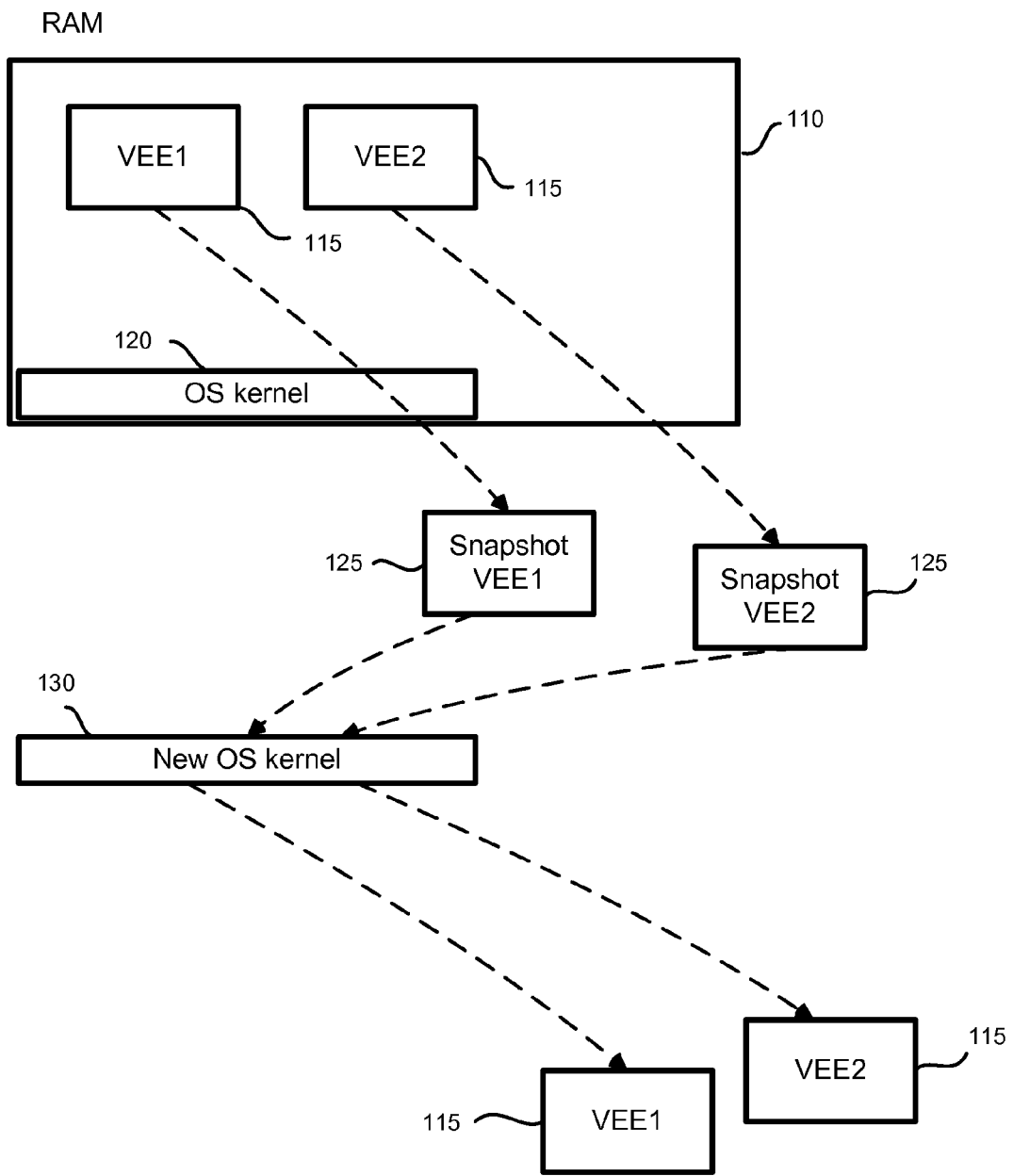
FIG. 1 illustrates a method, in accordance with the exemplary embodiment.

Reference will now be made in detail to the preferred embodiments of the present invention, examples of which are illustrated in the accompanying drawings.

The following definitions are generally used throughout this description:

VEE—Virtual Execution Environment, a type of environment that supports program code execution, where at least a part of the real hardware and software required for running program code are presented as their virtual analogs. From the point of view of the user, the code in VEE runs as if it were running on the real computing system. An example of VEE is a Virtual Machine (VM).

VE—Virtual Environment, for example, a Virtual Private Server (VPS), is one type of a Virtual Execution Environment (VEE) running on the same hardware system with a shared OS kernel and most of the system resources, where isolation of Virtual Execution Environments is implemented on the namespace level.

A Virtual Private Server (VPS), sometimes referred to as "container" is a closed set, or collection, of processes, system resources, users, groups of users, objects and data structures. Each VPS has its own ID, or some other identifier, that distinguishes it from other VPSs. A VPS virtualizes the OS.

The VPS offers to its users a service that is functionally substantially equivalent to a standalone server with a remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and web servers, etc.

In other words, the full range of system administrator functions is desirable, as if the VPS were a dedicated remote server, with the existence of the VPS being transparent from the perspective of both the VPS user and the VPS administrator.

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Hypervisor—controls software, while having the highest privilege level for administrating hardware computer resources and Virtual Machines.

A VEE, according to an exemplary embodiment, can be any of a Virtual Private Server, a Virtual Machine, a Hypervisor-based Virtual Machine, and a Lightweight Hypervisor-based Virtual Machine, a session of Terminal Server Windows 2003 (or older) and a session of Citrix Presentation Server, Lightweight Hypervisor-based Virtual Machines, VMM-based VMs or hypervisor-based VMs.

The present invention is directed to reloading the OS on a computer system without memory reset or restoration. According to an exemplary embodiment, a computer system has an OS running on it. For the purpose of this discussion, a host OS kernel is referred to as the OS. The computer system has Virtual Execution Environments (VEE)—e.g., containers and/or VMs, an old OS or host OS (to be replaced), a memory area, which has data needed for system restart and restore from the container. The memory can be fragmented, and the container's (VMs') data can be placed in arbitrary locations.

Snapshots of the containers or VMs (including CPU registers, flags, and memory state) are generated and kept in the RAM. The containers (or VMs) are moved into the snapshot location and a new OS is activated in the memory. According to the exemplary embodiment, the snapshot is generated by the old (i.e., existing) OS. The new OS is loaded by a special loading module. An example of such a module is called kexec, which is a mechanism that allows to replace one Linux kernel with another Linux kernel, directly in the memory without full hardware reset.

Then, control is given to the new OS by the loading module, by, for example, changing the execution context and a JMP instruction or similar. After the new OS is launched, the new OS receives data needed for restoration of the system from the snapshot. Then, the new OS activates the containers (VMs). The new OS reads the snapshot data and restores it into operating (physical) memory.

Note that the memory is, advantageously, available during installation of the new OS kernel. In one exemplary embodiment, checkpoints can be implemented for all of the containers. The checkpoints are taken and stored in the memory and then, the container (or the VM) operation and any user applications running therein (and typically, any applications running under the host OS) are stopped and the container (or the VM) is loaded into or activated in the memory.

Then, upon installation, the new OS restores all the containers and any user applications by using the checkpoints. In other words, the new OS has to be able to identify the checkpoints and restart the relevant VEEs (containers and/or VMs) and applications from the checkpoints and the snapshots.

According to the exemplary embodiment, a snapshot of a container (or a VM) includes all data needed for launching the container/VM. Thus, some of the disk caches can be possibly included into a snapshot along with the container data, along with RAM state of the container/VM and CPU state (registers and flags). The new OS verifies the checkpoint using checksums or signatures (i.e., to ensure that the new OS has not overwritten the memory pages where the checkpoint and its corresponding data/snapshot "live"), and then restores the containers. In other words, the new OS knows the areas of the memory that cannot be erased (either by indicating that the relevant pages are write-protected, or by making some of the physical memory temporarily invisible to the new OS—for example, in a 1 TB machine, the OS is only initially aware of 900 GB). In cases of large containers/VMs, the snapshots can be compressed, for example, using deflate/lzw (implemented in gzip) or bwt (implemented in bzip2), or any number of others.

According to the exemplary embodiment, a special driver or a component can be used for restoration of the containers/VMs from the snapshots or checkpoints, such as described in U.S. Pat. No. 8,166,477, incorporated herein by reference in its entirety. The component can be either in kernel space (and then the snapshot is generated based on OS's object model) or in user space (and then the snapshot is generated using an OS API to try to understand the structure of objects in user space). Note that the snapshot is a snapshot of the VEE, and does not normally include OS objects. Contents of container memory (i.e., used by user processes of the VEE/container/VM) remains in the physical memory (RAM) where they were originally, without being copied anywhere. It is therefore important to ensure that when the new OS is loaded into memory, it does not overwrite or otherwise affect the snapshot pages with user data.

According to one exemplary embodiment, in case of the VM, the VM data required for a snapshot is provided by a Hypervisor. In case of a container, the container data is acquired from RAM. According to one exemplary embodiment, a disk cache is used instead of RAM for storing the container/VM open files' data. This can save several seconds per the VM/container, because of elimination of additional memory accesses. The file(s) is transferred into the file system disk cache and subsequently restored from the file system disk cache by the new OS.

According to another exemplary embodiment, a temporary file system is created. The temporary file system is filled with blank blocks (i.e., zeros). This allows for locating free memory before a container/VM is frozen. The kernel state is stored in the temporary file system. Subsequently, the kernel state is restored from the temporary file system by the new OS.

FIG. 1 illustrates a method, in accordance with the exemplary embodiment. Containers (or, more generally, VEEs, including containers, VMs, hosted VMs, hypervisor-based VMs, Xen-type VMs, etc.) 115 have data stored in RAM 110. The containers 115 run under a host OS 120. The host OS 120 needs to be loaded or reloaded (re-installed). Snapshots 125 of the containers are generated. A new OS kernel 130 is loaded into the memory. According to the exemplary embodiment, the snapshot is generated by the old host OS 120. The new OS 130 is loaded by a special loading module (not shown), which replaces one kernel with another. The loading module avoids downtime that otherwise comes from a long hardware reboot time. This is different from conventional loading modules, which assume that they work on freshly booted hardware and unpack a kernel to the first free place in memory and switch to it.

Then, control is given to the new OS 130 by the loading module. The new OS 130 is launched and data needed for restoration of the system from the snapshots 125 is received. Then, the new OS 130 activates the containers 115.

Figure 2:
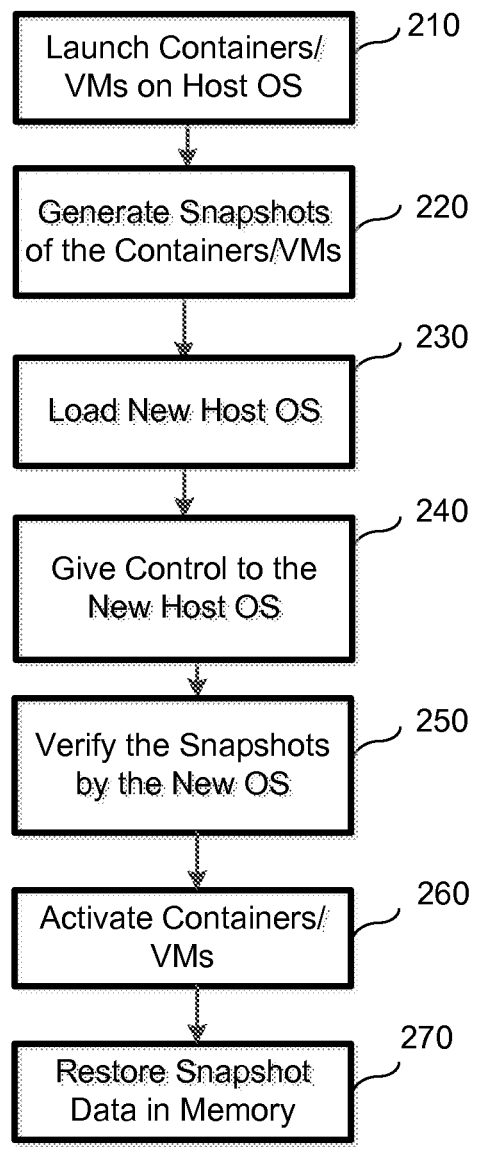
FIG. 2 illustrates a flow chart of the method for updating OS, in accordance with the exemplary embodiment.

FIG. 2 illustrates a flow chart of the method, in accordance with one exemplary embodiment. In step 210, the containers are launched on a host OS. The host OS generates snapshots (or checkpoints) of the containers in step 220. A new OS is loaded onto computer system by a loading module in step 230. Control is passed to the new OS by the loading module in step 240. Subsequently, in step 250, the new OS verifies the snapshots (or checkpoints), making sure that the new OS is not loaded into where the user processes kept their data, and the user process data (i.e., VEE data) in the memory is unaffected.

The containers are activated by the new OS in step 260. The container snapshot data is restored in memory in step 270.

Figure 3:
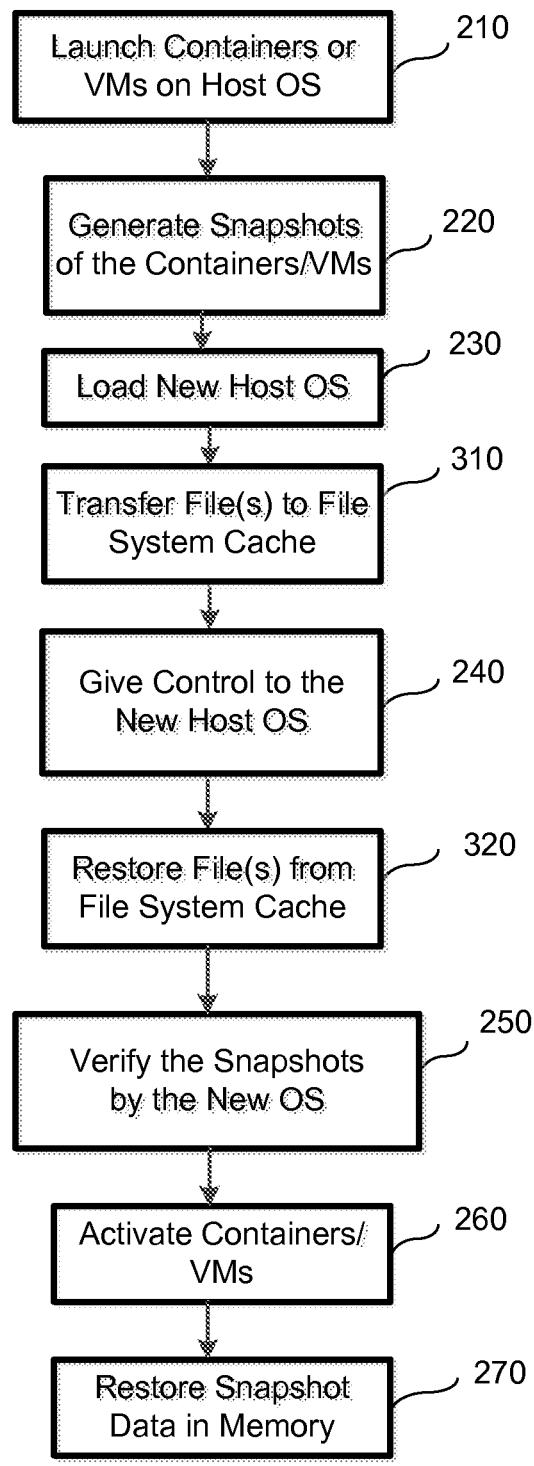
FIG. 3 illustrates a flow chart of the method for updating OS using a file system cache, in accordance with the another exemplary embodiment.

FIG. 3 illustrates a flow chart of the method, in accordance with yet another exemplary embodiment. In step 210, the containers (VMs) are launched on a host OS. The host OS generates snapshots (or checkpoints) of the containers in step 220. A new OS is loaded onto computer system by a loading module in step 230. In step 310, a file(s) is transferred to a file system cache. Subsequently, control is passed to the new OS by the loading module in step 240. Then, in step 320, the file(s) is restored from the file system disk cache. Thus, the memory access is minimized.

Subsequently, in step 250, the new OS verifies the snapshots (or checkpoints). The containers/VMs are activated by the new OS in step 260. The container/VM snapshot data is restored in memory in step 270.

Figure 4:
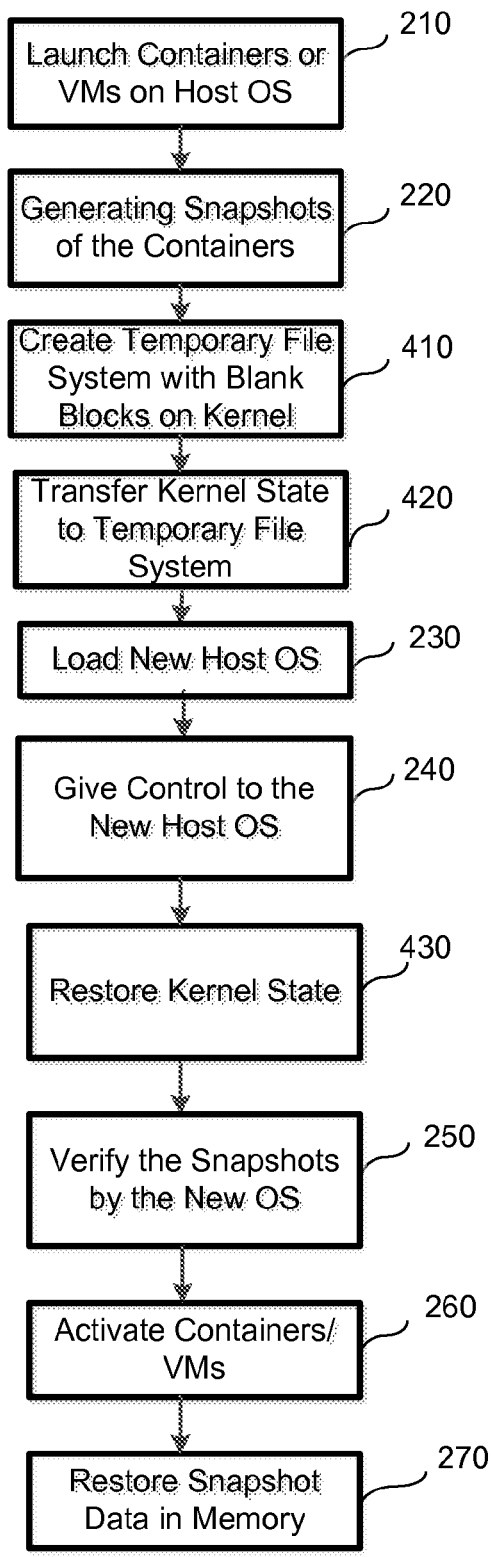
FIG. 4 illustrates a flow chart of the method for updating OS using a temporary file system, in accordance with the additional exemplary embodiment.

FIG. 4 illustrates a flow chart of the method, in accordance with yet another exemplary embodiment. In step 210, the containers/VMs are launched on a host OS. The host OS generates snapshots (or checkpoints) of the containers/VMs in step 220. In step 410, the process creates a temporary files system on the kernel. The temporary file system is filled with zeros (i.e., blank blocks). Subsequently, in step 420, the process transfers the kernel state to the temporary file system.

Then, a new OS is loaded onto the computer system by a loading module in step 230. Control is passed to the new OS by the loading module in step 240. Then, in step 430, the process restores the kernel state from the temporary file system. Subsequently, in step 250, the new OS verifies the snapshots (or checkpoints). The containers/VMs are activated by the new OS in step 260. Then, the container/VM snapshot data is restored in memory in step 270.

Note that some of the container/VM services can be terminated (instead of a graceful shut down) in order to minimize a down time as well.

Those skilled in the art will appreciate that the proposed method provides for an efficient installation of a new OS kernel on a computer system without restoration of a computer system's physical memory, with a minimal system down-time.

Figure 5:
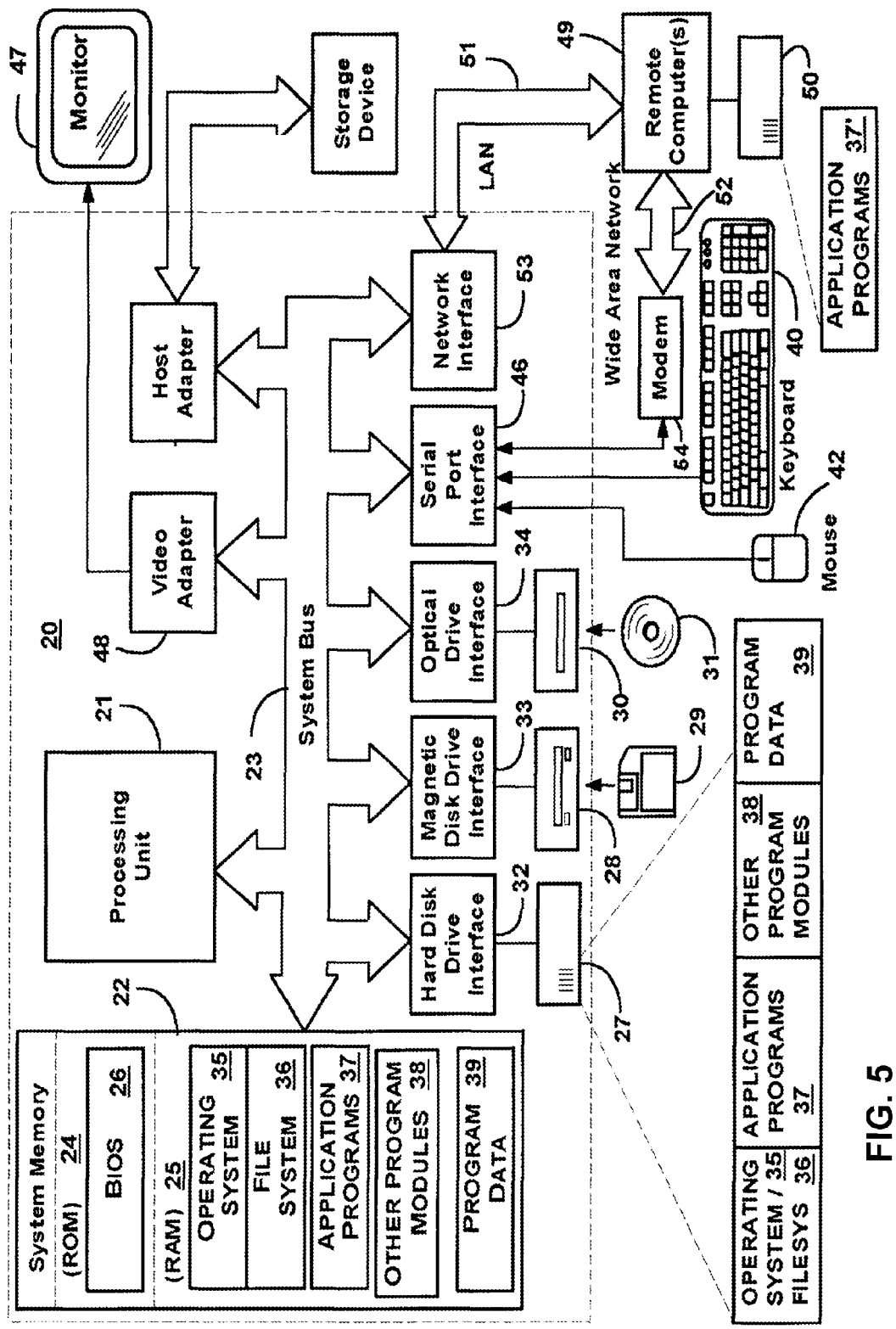
FIG. 5 illustrates an example of a computer (or a server) on which the invention may be implemented.

With reference to FIG. 5, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The computer 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB).

A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 20, although here only a memory storage device 50 is illustrated.

The logical connections include a local area network (LAN) 51 and a wide area network (WAN) 52. Such networking environments are common in offices, enterprise-wide computer networks, Intranets and the Internet. In a LAN environment, the personal computer 20 is connected to the local network 51 through a network interface or adapter 53. When used in a WAN networking environment, the personal computer 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the personal computer 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A computer-implemented method for updating an operating system (OS) without a memory reset, the method comprising:
    launching a Virtual Execution Environment (VEE) under a host OS of a computer system;
    generating a snapshot of the VEE, including snapshotting user process data, of any processes that run under the VEE;
    loading a new OS onto the computer system;
    giving control to the new OS without performing the memory reset;
    ensuring that the user process data that is part of the snapshot is unaffected by the loading of the new OS and that the user process data remains in its original location;
    re-launching the VEE under the new OS; and
    restoring the user process data from the snapshot into a random access memory.

2. The method of claim 1, wherein the restoring step utilizes a designated kernel space component.

3. The method of claim 1, wherein an OS object model is used to generate the snapshot.

4. The method of claim 1, wherein the restoring step utilizes a user space component.

5. The method of claim 1, wherein an OS API is used to generate the snapshot.

6. The method of claim 1, wherein the VEE is a container.

7. The method of claim 1, wherein the VEE is a Virtual Machine (VM).

8. The method of claim 1, further comprising transferring VEE files to a file system cache and restoring the files from the file system cache upon transferring control to the new OS.

9. The method of claim 1, further comprising:
    creating a temporary file system filled with blank blocks;
    transferring a kernel state into the temporary file system; and
    restoring the kernel state upon transferring control to the new OS.

10. The method of claim 1, further comprising using VEE checkpoints to perform the restoring.

11. The method of claim 1, wherein the ensuring is performed using checksums to ensure that the new OS has not overwritten memory pages where the snapshot is located.

12. The method of claim 1, wherein the VEE snapshots are compressed.

13. The method of claim 1, wherein the user process data is located in a random access memory.

14. The method of claim 1, further comprising giving control to the new OS after the loading of the new OS.

15. The method of claim 1, further comprising using signatures to ensure that the new OS has not overwritten memory pages where the snapshot is located.

16. The method of claim 1, further comprising making memory pages where the snapshot is located invisible to the new OS.

17. The method of claim 1, further comprising write-protecting memory pages where the snapshot is located.

18. A system for updating an operating system without a memory reset, the system comprising:
    a processor;
    a memory coupled to the processor;
    a computer program logic stored in the memory and executed on the processor, the computer program logic for implementing the steps of:
    launching a Virtual Execution Environment (VEE) under a host OS of a computer system;
    generating a snapshot of the VEE, including snapshotting user process data, of any processes that run under the VEE;
    loading a new OS onto the computer system;
    giving control to the new OS without performing the memory reset;
    ensuring that the user process data that is part of the snapshot is unaffected by the loading of the new OS and that the user process data remains in its original location;
    re-launching the VEE under the new OS; and
    restoring the user process data from the snapshot into a random access memory.

* * * * *